United States Patent
Jo et al.

(10) Patent No.: US 11,042,866 B2
(45) Date of Patent: Jun. 22, 2021

(54) MOBILE DEVICE AND METHOD FOR ACCESSING ACCESS POINT OF WIRELESS LAN

(71) Applicant: Samsung Electronics Co., Ltd., Suwon-si (KR)

(72) Inventors: Hyun-a Jo, Goyang-si (KR); Jae-hong Jo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 15/817,889

(22) Filed: Nov. 20, 2017

(65) Prior Publication Data

US 2018/0165671 A1 Jun. 14, 2018

(30) Foreign Application Priority Data

Dec. 9, 2016 (KR) .................. 10-2016-0168007

(51) Int. Cl.
| | | |
|---|---|---|
| *G06Q 30/02* | (2012.01) | |
| *G06Q 40/00* | (2012.01) | |
| *G06Q 20/40* | (2012.01) | |
| *G06Q 20/32* | (2012.01) | |
| *G06F 21/35* | (2013.01) | |

(52) U.S. Cl.
CPC .......... *G06Q 20/325* (2013.01); *G06Q 20/32* (2013.01); *G06Q 20/322* (2013.01); *G06Q 20/40* (2013.01); *G06Q 30/0208* (2013.01); *G06F 21/35* (2013.01)

(58) Field of Classification Search
CPC .............. G06Q 20/102; G06Q 20/341; G06Q 20/3674; G06Q 40/00; G06Q 30/0208
USPC .......... 705/40, 53, 59, 39, 26.1, 27.1, 44, 56
See application file for complete search history.

(56) References Cited

U.S. PATENT DOCUMENTS

| | | | | |
|---|---|---|---|---|
| 5,699,528 A | * | 12/1997 | Hogan | G06Q 20/04 705/40 |
| 5,715,314 A | * | 2/1998 | Payne | G06Q 10/087 705/26.35 |
| 7,221,929 B2 | * | 5/2007 | Lee | G06Q 20/28 379/114.28 |

(Continued)

FOREIGN PATENT DOCUMENTS

| | | |
|---|---|---|
| KR | 10-2012-0129508 A | 11/2012 |
| KR | 10-2014-0108858 A | 9/2014 |

(Continued)

OTHER PUBLICATIONS

Luo et al., "A secure public wireless LAN access technique that supports walk-up users," GLOBECOM '03. IEEE Global Telecommunications Conference (IEEE Cat. No.03CH37489), San Francisco, CA, USA, 2003, pp. 1415-1419 vol. 3 (Year: 2003).*

*Primary Examiner* — Kelly S. Campen
(74) *Attorney, Agent, or Firm* — Jefferson IP Law, LLP

(57) ABSTRACT

A method, performed by a mobile device, of accessing an access point (AP) of a wireless local area network (WLAN) is provided. The method includes requesting a payment terminal to allow payment for a service or product provided by a store where the payment terminal is provided, in order to access the AP of the store, receiving access information used to access the AP from a payment server connected to the payment terminal, as the payment is authenticated by the payment server, and accessing the AP, based on the received access information.

11 Claims, 10 Drawing Sheets

(56) References Cited

U.S. PATENT DOCUMENTS

| | | | |
|---|---|---|---|
| 7,616,947 B2 * | 11/2009 | Bowne | G06Q 20/102 |
| | | | 455/414.1 |
| 8,660,492 B2 | 2/2014 | Hong et al. | |
| 9,179,397 B2 * | 11/2015 | Meylan | H04W 48/16 |
| 9,386,014 B2 * | 7/2016 | Redberg | H04L 63/067 |
| 9,875,092 B2 * | 1/2018 | Tervo | G06Q 30/0214 |
| 10,360,593 B2 * | 7/2019 | Hunter | H04H 20/61 |
| 10,810,603 B2 * | 10/2020 | Ghosh | G06Q 30/0201 |
| 2013/0297422 A1 * | 11/2013 | Hunter | H04W 4/023 |
| | | | 705/14.58 |
| 2013/0311301 A1 * | 11/2013 | Grant | G06Q 30/0273 |
| | | | 705/14.69 |
| 2015/0019350 A1 * | 1/2015 | Grant | G06Q 30/0275 |
| | | | 705/14.71 |
| 2015/0019432 A1 * | 1/2015 | Burns | G06Q 20/3278 |
| | | | 705/44 |
| 2015/0110007 A1 * | 4/2015 | Tervo | H04W 28/0263 |
| | | | 370/329 |
| 2015/0249946 A1 | 9/2015 | Oh | |
| 2015/0317649 A1 * | 11/2015 | Joshi | G06Q 30/0207 |
| | | | 705/7.32 |
| 2015/0356660 A1 * | 12/2015 | L'Heureux | G06Q 30/0267 |
| | | | 705/14.53 |
| 2016/0174106 A1 * | 6/2016 | Lee | H04W 40/20 |
| | | | 705/14.63 |
| 2016/0210615 A1 | 7/2016 | Lee et al. | |
| 2017/0169441 A1 * | 6/2017 | Ghosh | G06Q 30/0201 |
| 2018/0181993 A1 * | 6/2018 | Kim | G06Q 30/0261 |
| 2018/0255109 A1 * | 9/2018 | Naidu | H04L 65/403 |

FOREIGN PATENT DOCUMENTS

| | | | | |
|---|---|---|---|---|
| KR | 10-2015-0063385 A | 6/2015 | | |
| KR | 10-1628115 B1 | 6/2016 | | |
| KR | 10-2016-0090236 A | 7/2016 | | |
| WO | WO-2013163333 A2 * | 10/2013 | | H04W 4/023 |
| WO | WO-2014096510 A1 * | 6/2014 | | H04L 63/083 |

* cited by examiner

MOBILE DEVICE AND METHOD FOR ACCESSING ACCESS POINT OF WIRELESS LAN

CROSS-REFERENCE TO RELATED APPLICATION(S)

This application claims the benefit under 35 U.S.C. § 119(a) of a Korean patent application filed on Dec. 9, 2016, in the Korean Intellectual Property Office and assigned Serial number 10-2016-0168007, the disclosure of which is incorporated herein in its entirety by reference.

TECHNICAL FIELD

The present disclosure relates to a mobile device and a method of accessing an access point (AP) of a wireless local area network (WLAN). More particularly, the present disclosure relates to a device and a method of accessing an AP of a WLAN, based on a payment system.

BACKGROUND

With developments in data processing technology and networking technology, users have become able to pay for services or products by using various devices. Moreover, users have become able to use the Internet via a wireless local area network (WLAN) in most stores that provide services or products.

Accordingly, an operator of a store installs a WLAN access point (AP), and sets security so that only users having paid for services or products may access the WLAN AP. For example, in a coffee shop, when a user conducts a payment for a beverage, such as a cup of coffee, the user may be provided with information, such as a password for accessing an AP, through a payment receipt.

However, when the user accesses the AP by manually inputting access information via the payment receipt, several inconveniences, such as mislaying the payment receipt and a situation where it is difficult to input the password, may occur when accessing the AP in order to use the wireless Internet.

Therefore, a need exists for enabling the mobile device to effectively access a WLAN AP, when a user performs a payment by using a mobile device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a mobile device for payment accesses a wireless local area network (WLAN) access point (AP).

In accordance with an aspect of the present disclosure, a mobile device is provided. The mobile device includes a memory configured to store at least one program, at least one communication interface configured to transmit or receive data to or from a payment terminal and a payment server, and a processor configured to execute the at least one program so that the mobile device accesses an AP of a WLAN, wherein the at least one program includes instructions for executing operations of requesting the payment terminal to allow payment for a service or product provided by a store where the payment terminal is provided, in order to access the AP of the store, receiving access information used to access the AP from a payment server connected to the payment terminal, as the payment is authenticated by the payment server, and accessing the AP, based on the received access information.

In accordance with another aspect of the present disclosure, a method, performed by a mobile device, of accessing an AP of a WLAN is provided. The method includes requesting a payment terminal to allow payment for a service or product provided by a store where the payment terminal is provided, in order to access the AP of the store, receiving access information used to access the AP from a payment server connected to the payment terminal, as the payment is authenticated by the payment server, and accessing the AP, based on the received access information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The present disclosure will now be described more fully with reference to the accompanying drawings, in which various embodiments of the disclosure are shown.

Figure 1:
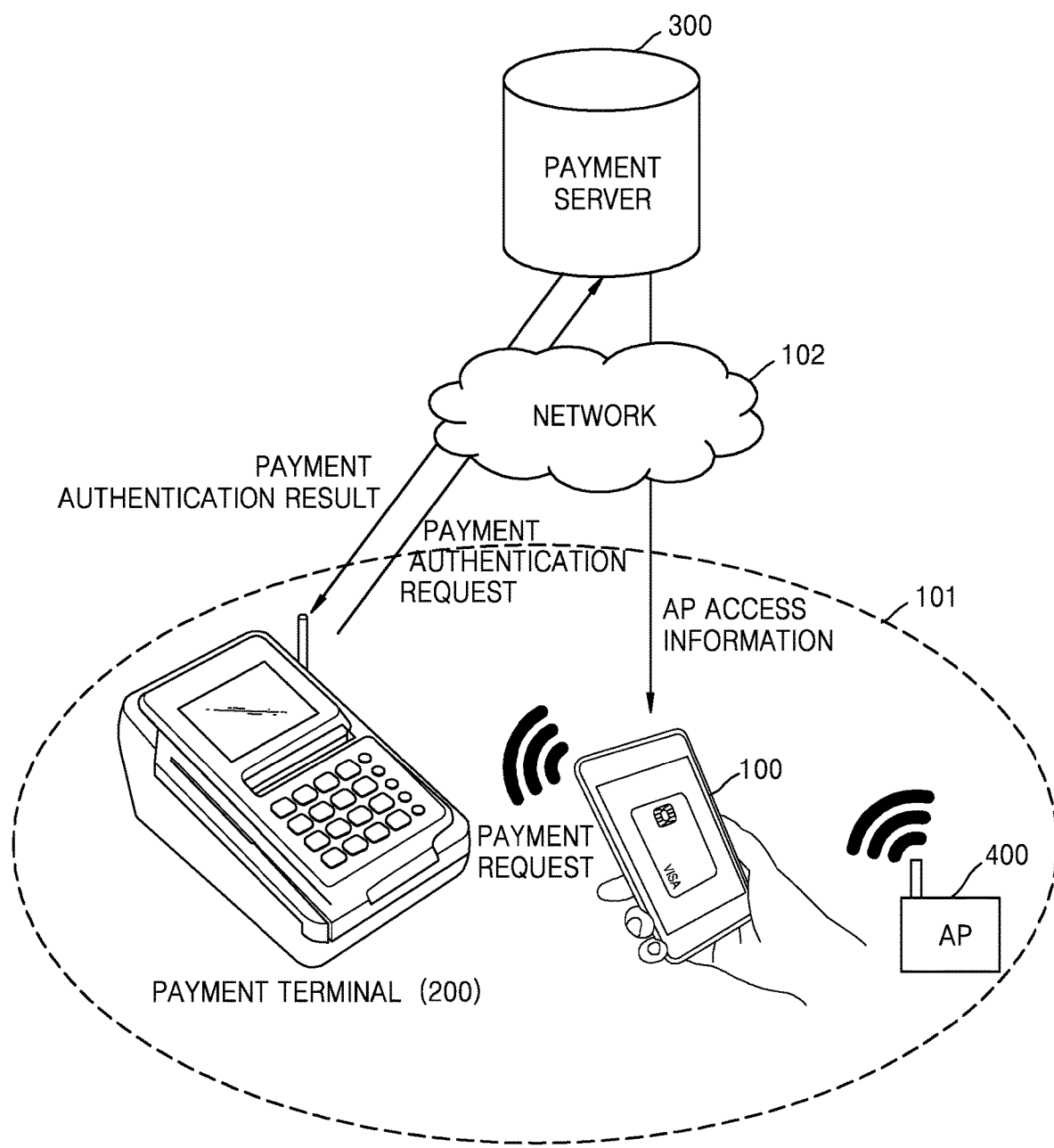
FIG. 1 is a schematic view illustrating an access information providing system that provides a mobile device with access information used to access an access point (AP) of a wireless local area network (WLAN), according to an embodiment of the present disclosure.

FIG. 1 is a schematic view illustrating an access information providing system that provides a mobile device with access information used to access an access point (AP) of a wireless local area network (WLAN) according to an embodiment of the present disclosure.

Referring to FIG. 1, according to an embodiment of the present disclosure, a store 101 may include an AP 400, via which a user having paid a service or product provided by the store 101 is able to use a wireless Internet via the WLAN. For example, when the user has completed a payment for the service or product provided by the store 101 by using a mobile device 100, a payment server 300 may provide access information helping the mobile device 100 of the user to access the AP 400 of the store 101.

The access information providing system according to an embodiment may include the mobile device 100, a payment terminal 200, the payment server 300, and the AP 400.

The mobile device 100 may request the payment terminal 200 to pay a service or product provided by the store 101, may receive the access information used to access the AP 400 of the store 101 from the payment server 300 as the payment is authenticated, and may access the AP 400.

The mobile device 100 may include a function for paying a service or product provided by the store 101. The store 101 may be an offline space that provides certain services or products. For example, the store 101 may be a partial space of a building that provides a beverage selling service. For example, the mobile device 100 may include a magnetic secure transmission (MST) module for performing an MST type payment.

The mobile device 100 may communicate with the payment server 300 via a network 102. The mobile device 100 may access the AP 400 and may be connected to the WLAN via the AP 400.

Examples of the mobile device 100 may include, but are not limited to, a smartphone, a tablet personal computer (PC), a mobile phone, a personal digital assistant (PDA), a laptop, a media player, a micro-server, a global positioning system (GPS) device, an electronic book terminal, a digital broadcasting terminal, a navigation device, a moving picture experts group phase 1 or phase 2 (MPEG-1 or MPEG-2) audio layer 3 (MP3) player, a digital camera, and other mobile computing devices. The mobile device 100 may also be a watch, glasses, a hair band, or a ring each having a communication function and a data processing function. However, embodiments of the present disclosure are not limited thereto, and the mobile device 100 may be any kind of mobile device capable of processing data and communicating with other devices.

The payment terminal 200 may be a terminal disposed in the offline store 101. The payment terminal 200 may be a terminal disposed to pay services or products provided by the store 101. The payment terminal 200 may be a stationary terminal provided in the store 101. Alternatively, the payment terminal 200 may be a movable terminal provided in the store 101.

The payment terminal 200 may pay services or products provided by the store 101 by communicating with the payment server 300 via the network 102. The payment terminal 200 may receive a payment request for a certain service or product from the mobile device 100, and may request the payment server 300 to authenticate a payment for the certain service or product. The payment terminal 200 may receive from the payment server 300 a result of the authentication of the payment for the certain service or product.

The payment terminal 200 may be a point of sales (POS) terminal used to pay services or products provided by the store 101, but embodiments are not limited thereto. The payment terminal 200 may be a terminal including an MST type payment system.

The payment server 300 may be a server that authenticates a payment, and may be operated by at least one operator. The payment server 300 may be a single server that is operated by at least one operator, but embodiments are not limited thereto. The payment server 300 may include a plurality of servers that are operated by a plurality of operators. For example, the payment server 300 may include a server that manages card information related with a payment and handles a payment, and a server that authenticates a payment.

The payment server 300 may include a database (DB) for providing services other than payment authentication. For example, the payment server 300 may include a DB that stores access information used to access the AP 400 of the WLAN of the store 101. The payment server 300 may provide a service for transmitting the access information to the mobile device 100 according to a result of the payment authentication.

The payment server 300 may communicate with the mobile device 100 and the payment terminal 200 via the at least one network 102. The payment server 300 may transmit the access information used to access the AP 400 to the mobile device 100 via the network 102. The payment server 300 may transmit a result of the authentication of a certain service or product to the payment terminal 200 via the network 102.

The network 102 may be a comprehensive data communication network including a local area network (LAN), a wide area network (WAN), a value added network (VAN), a mobile radio communication network, a satellite communication network, and a combination thereof. Examples of the network 102 may include the wired Internet, the wireless Internet, and a mobile wireless communication network. Examples of wireless communication may include, but are not limited to, Wi-Fi, Bluetooth (BT), Bluetooth low energy (BLE), ZigBee, Wi-Fi Direct (WFD), ultra wideband (UWB), infrared Data Association (IrDA), and near field communication (NFC).

The AP 400 may be a network assisting device that enables a mobile device having accessed the AP 400 to communicate via a network connected to the AP 400. For example, the AP 400 may be a WLAN AP that enables the mobile device 100 having accessed the AP 400 to use the wireless Internet via the WLAN. The AP 400 may be a network assisting device having a pre-allocated service set identifier (SSID), a pre-allocated media access control (MAC) address, and a pre-allocated password for accessing the AP 400.

The mobile device 100 may efficiently access the AP 400 provided by the store 101, by receiving the access information used to access the AP 400 from the payment server 300 via the above-described access information providing system.

Figure 2:
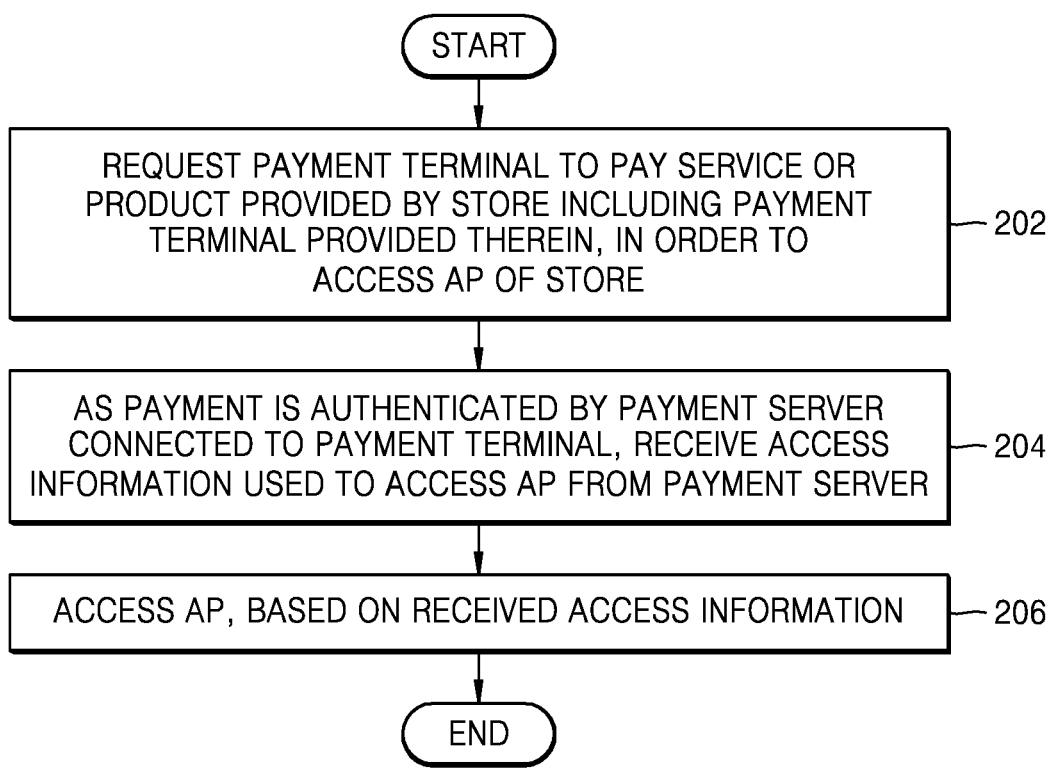
FIG. 2 is a flowchart illustrating a method of operating a mobile device according to an embodiment of the present disclosure.

FIG. 2 is a flowchart illustrating a method of operating a mobile device according to an embodiment of the present disclosure.

Referring to FIG. 2, in operation 202, the mobile device 100 may request the payment terminal 200 to pay a service or product provided by a store including the payment terminal 200, in order to access the AP 400 of the store. The service provided by the store may be a beverage making service, a music listening service, or the like, and the product provided by the store may be food and beverage, a book, or the like. However, embodiments are not limited thereto, and the service or product provided by the store may be any typical service or product that is to be paid.

According to an embodiment of the present disclosure, the AP 400 may be disposed within a preset range from a position where the payment terminal 200 is located. For example, the AP 400 may be provided within the store including the payment terminal 200 provided therein. Alternatively, the AP 400 may be provided outside the building of the store. The store, the payment terminal 200, and the AP 400 may be operated and/or managed by the same person.

According to an embodiment of the present disclosure, the mobile device 100 may request the payment terminal 200 to pay the service or product provided by the store, based on a user input of requesting payment for the service or product. For example, the mobile device 100 may obtain the user input of requesting payment for the service or product via a user interface (UI). Based on the user input, the mobile device 100 may request the payment terminal 200 to pay the service or product, by executing a payment application which is a payment method for the service or product.

The payment application may be an application installed in the mobile device 100 to provide a UI for a payment request.

According to an embodiment of the present disclosure, the mobile device 100 may request the payment terminal 200 to pay the service or product provided by the store, by transmitting card information for payment to the payment terminal 200. For example, the mobile device 100 may transmit the card information to the payment terminal 200 by generating a magnetic field by using an MST module.

In operation 204, as the payment is authenticated by the payment server 300 connected to the payment terminal 200, the mobile device 100 may receive access information used to access the AP 400 from the payment server 300.

According to an embodiment of the present disclosure, the payment server 300 and the payment terminal 200 may transmit or receive data to or from each other via a wired or wireless network. The payment terminal 200 may request the payment server 300 to authenticate payment for a certain service or product, via a network. At the request of the payment terminal 200 for payment authentication, the payment server 300 may request the payment terminal 200 for information necessary for performing the authentication. The payment server 300 may receive from the payment terminal 200 the information necessary for performing the authentication.

According to an embodiment of the present disclosure, when the payment according to the payment request of the mobile device 100 is authenticated by the payment server 300, the mobile device 100 may receive the access information used to access the AP 400 from the payment server 300 via a network. The access information is used to access the AP 400. Examples of the access information may include, but are not limited to, an SSID of the AP 400, a MAC address of the AP 400, and a password for accessing the AP 400. The access information may be information matched with the payment terminal 200 and registered in the payment server 300.

According to an embodiment of the present disclosure, when an error occurs while the payment server 300 is performing authentication of the payment according to the payment request of the mobile device 100, the payment server 300 may not transmit the access information used to access the AP 400 to the mobile device 100.

In operation 206, the mobile device 100 may access the AP 400, based on the received access information. For example, the mobile device 100 may identify the AP 400 of the store from among found APs, by using the SSID included in the access information. The mobile device 100 may access the AP 400 of the store, by inputting the password included in the access information.

According to an embodiment of the present disclosure, the mobile device 100 may receive from the payment server 300 access information encrypted using a preset public key.

The public key may be a key used by the mobile device 100 to encrypt a card number for a payment. For example, the mobile device 100 may encrypt a card number of a user stored in the mobile device 100 in order to prevent the card number from being leaked to the outside while being transmitted to the payment terminal 200. The public key may be an authentication key that is shared between the mobile device 100 and the payment server 300, in order to encrypt the card number or decrypt an encrypted card number.

The mobile device 100 may decrypt the encrypted access information by using the public key. The mobile device 100 may access the AP 400, based on decrypted access information.

By receiving the encrypted access information, the mobile device 100 may prevent access information used to access an AP of a store from being leaked to a non-authenticated apparatus while being transmitted or received.

Figure 3:
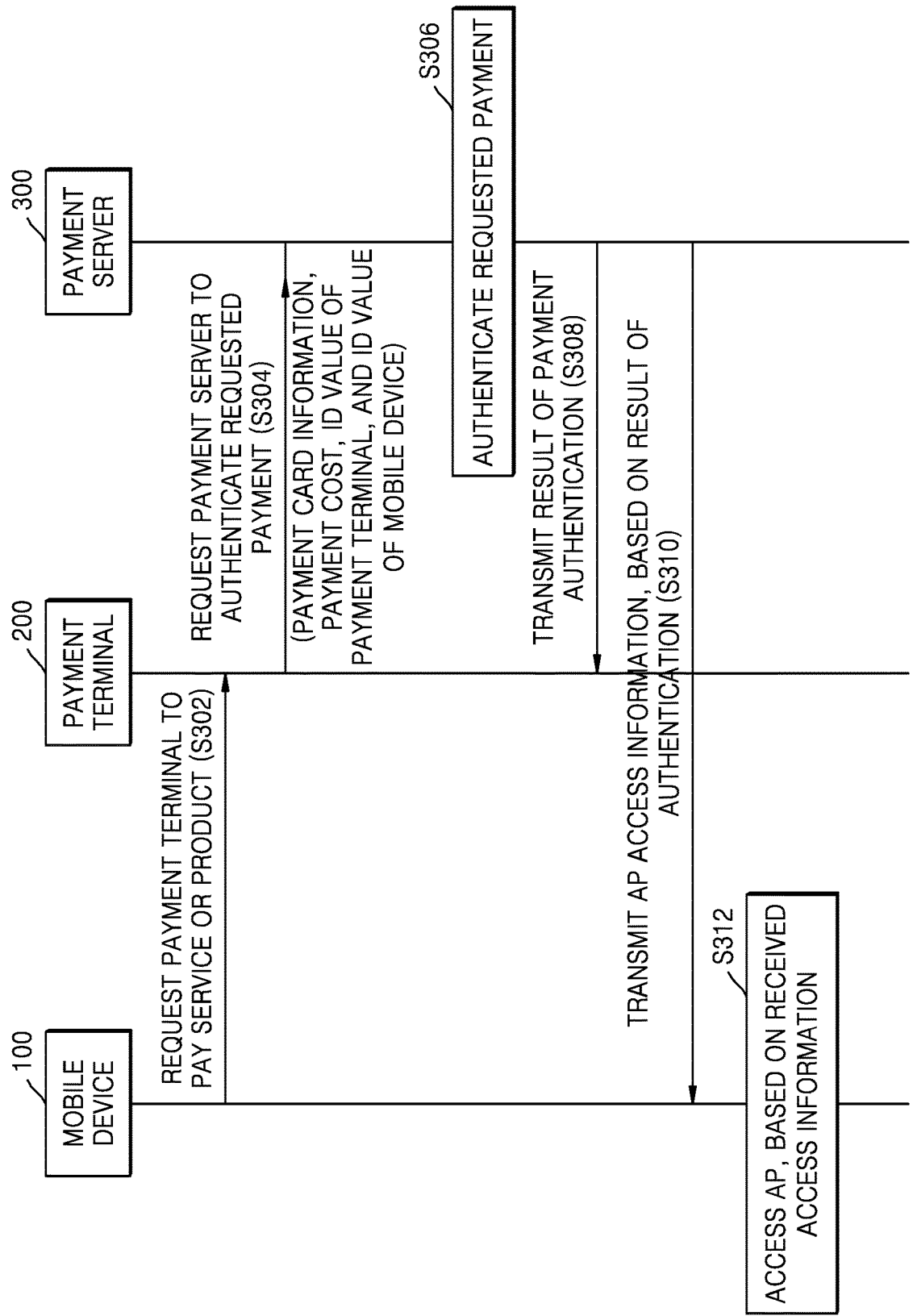
FIG. 3 is a flowchart illustrating a method in which a payment server provides access information, which is used to access a WLAN AP to a mobile device according to an embodiment of the present disclosure.

FIG. 3 is a flowchart illustrating a method in which a payment server provides access information, which is used to access a WLAN AP, to a mobile device, according to an embodiment of the present disclosure.

Referring to FIG. 3, in operation S302, the mobile device 100 may request the payment terminal 200 to pay a service or product provided by a store. For example, the mobile device 100 may request the payment by transmitting card information pre-stored in the mobile device 100 and an ID value of the mobile device 100 to the payment terminal 200. The ID value of the mobile device 100 may be used to receive the access information from the payment server 300.

In operation S304, the payment terminal 200 may request the payment server 300 to authenticate the payment requested by the mobile device 100. The payment terminal 200 may request the payment server 300 to authenticate the payment, by transmitting information used to authenticate the payment to the payment server 300. For example, the information used to authenticate the payment may include payment card information, a payment cost, an ID value of the payment terminal 200, and the ID value of the mobile device 100. The ID value of the mobile device 100 may be, for example, a telephone number of the mobile device 100, but embodiments are not limited thereto. The information used to authenticate the payment may also include information (for example, a name or a registration number of a product) about a service or product selected by a user from among services or products provided by the store.

In operation S306, the payment server 300 may authenticate the payment requested by the mobile device 100. The payment server 300 may authenticate the payment requested by the mobile device 100, based on the information which is received from the payment terminal 200 and used to authenticate the payment.

For example, the payment server 300 may authenticate the payment, based on the payment card information and the payment cost received from the payment terminal 200. Specifically, the payment server 300 may authenticate the payment by comparing the payment card information received from the payment terminal 200 with card information stored in a DB of the payment server 300.

In operation S308, the payment server 300 may transmit to the payment terminal 200 a result of the payment authentication according to the payment authentication request. The payment server 300 may transmit a payment authentication result, such as 'payment approval' or 'payment disapproval', to the payment terminal 200 via a network, based on the ID value of the payment terminal 200 having requested the payment authentication. When an error occurs during the payment authentication, the payment server 300 may transmit a reason for the error together with the payment authentication result to the payment terminal 200.

In operation S310, the payment server 300 may transmit access information used to access an AP to the mobile device 100, based on the result of the authentication performed in operation S306. For example, when the payment request of the mobile device 100 is authenticated by the payment server 300, the payment server 300 may transmit the access information to the mobile device 100 via mobile communication.

According to an embodiment of the present disclosure, the payment server 300 may transmit, to the mobile device 100, access information of the AP 400 corresponding to the ID value of the payment terminal 200 received from the payment terminal 200.

According to an embodiment of the present disclosure, the payment server 300 may transmit the access information to the mobile device 100 by using the ID value of the mobile device 100 received from the payment terminal 200. Alternatively, according to an embodiment of the present disclosure, the ID value of the mobile device 100 may be an ID value pre-registered in the payment server 300. For example, when the mobile device 100 registers the card information for performing payment by using the mobile device 100 in the payment server 300, the ID value of the mobile device 100 may be stored together with the card information in the payment server 300.

In operation S312, the mobile device 100 may access the AP, based on the received access information.

Figure 4:
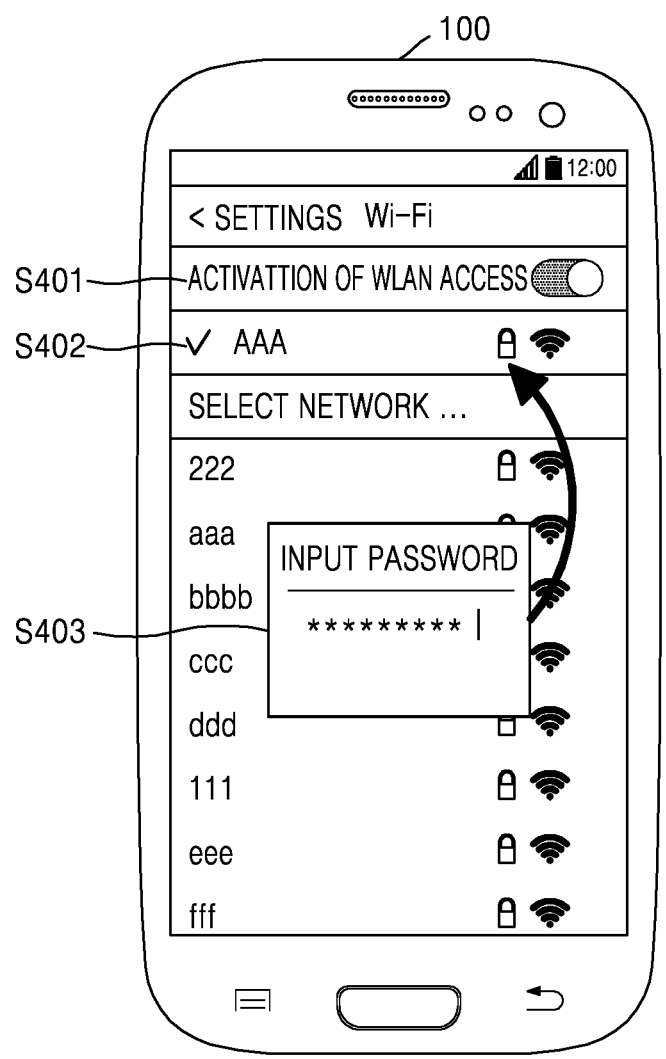
FIG. 4 illustrates a mobile device accessing an AP of a WLAN by using access information received from a payment server according to an embodiment of the present disclosure.

FIG. 4 illustrates a mobile device accessing an AP of a WLAN by using access information received from a payment server according to an embodiment of the present disclosure.

Referring to FIG. 4, according to an embodiment of the present disclosure, an AP of a store may have an SSID of 'AAA' and a password of '123456789', and the mobile device 100 may try to access the AP of the store.

In operation S401, the mobile device 100 may activate a WLAN accessing function of the mobile device 100 in order to access the AP of the WLAN. As access information used to access the AP is received from the payment server 300, the mobile device 100 may activate the WLAN accessing function of the mobile device 100.

In operation S402, the mobile device 100 may identify the AP that is to be accessed, from among a plurality of APs. For example, as the WLAN accessing function is activated, the mobile device 100 may search for at least one AP (a first AP having an SSID of '111', a second AP having an SSID of '222', and a third AP having an SSID of 'AAA') that provides access to the WLAN. The mobile device 100 may identify the third AP that is to be accessed by the mobile device 100, from among the found APs, based on the access information received from the payment server 300.

For example, the mobile device 100 may receive access information (SSID: 'AAA'/password: '123456789') from the payment server 300. The mobile device 100 may extract the SSID ('AAA') of the AP of the store from the access information and identify the AP of the store from among the plurality of APs.

In operation S403, the mobile device 100 may input a password of the AP that is to be accessed. For example, when the mobile device 100 transmits a signal for accessing the third AP to the third AP, the third AP may request the mobile device 100 for a password.

The mobile device 100 may extract the password of the third AP from the access information received from the payment server 300. The mobile device 100 may input '123456789', which is the password of the third AP, in response to the request of the third AP.

The mobile device 100 may efficiently access the AP of the store, by identifying the SSID of the AP of the store and inputting the password.

As described above, the mobile device 100 may efficiently access the AP, based on the access information received from the payment server 300, thereby promoting the convenience of a user. The mobile device 100 may improve a data communication environment of the mobile device 100 by reducing the number of attempts to access an AP having no security information.

Figure 5:
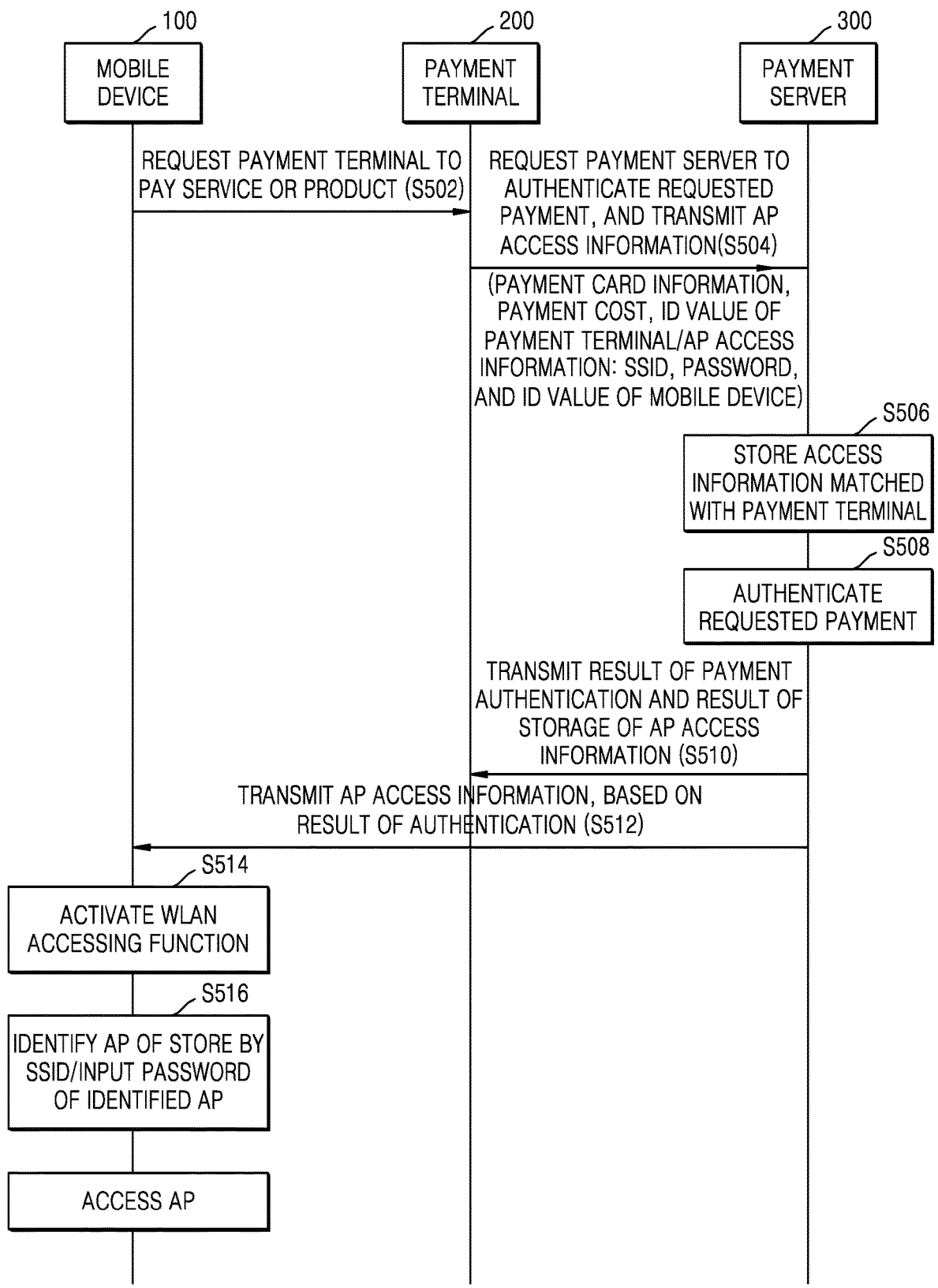
FIG. 5 is a flowchart illustrating a method in which a payment server provides access information, which is used to access a WLAN AP, to a mobile device according to an embodiment of the present disclosure.

FIG. 5 is a flowchart illustrating a method in which a payment server provides access information, which is used to access a WLAN AP, to a mobile device, according to an embodiment of the present disclosure.

Referring to FIG. 5, in operation S502, the mobile device 100 may request the payment terminal 200 to pay a service or product provided by a store.

In operation S504, the payment terminal 200 may request the payment server 300 to authenticate the payment requested by the mobile device 100 and at the same time may transmit access information used to access an AP of the store to the payment server 300. For example, the payment terminal 100 may transmit the access information together with information used to authenticate the payment.

In operation S506, the payment server 300 may store access information matched with the payment terminal 200 in the DB of the payment server 300. In operation S508, the payment server 300 may authenticate the payment requested by the mobile device 100. In operation S510, the payment server 300 may transmit to the payment terminal 200 a result of the payment authentication according to the payment authentication request and a result of the storage of the access information.

In operation S512, the payment server 300 may transmit access information used to access the AP to the mobile device 100, based on the result of the authentication performed in operation S508. When the payment is authenticated by the payment server 300, the payment server 300 may transmit the access information received from the payment terminal 200 to the mobile device 100.

In operation S514, the mobile device 100 may activate a WLAN accessing function as the access information is received from the payment server 300. In operation S516, the mobile device 100 may identify the AP of the store by using an SSID extracted from the access information. In operation S518, the mobile device 100 may extract a password of the identified AP from the access information, and input the password, thereby accessing the AP.

Figure 6:
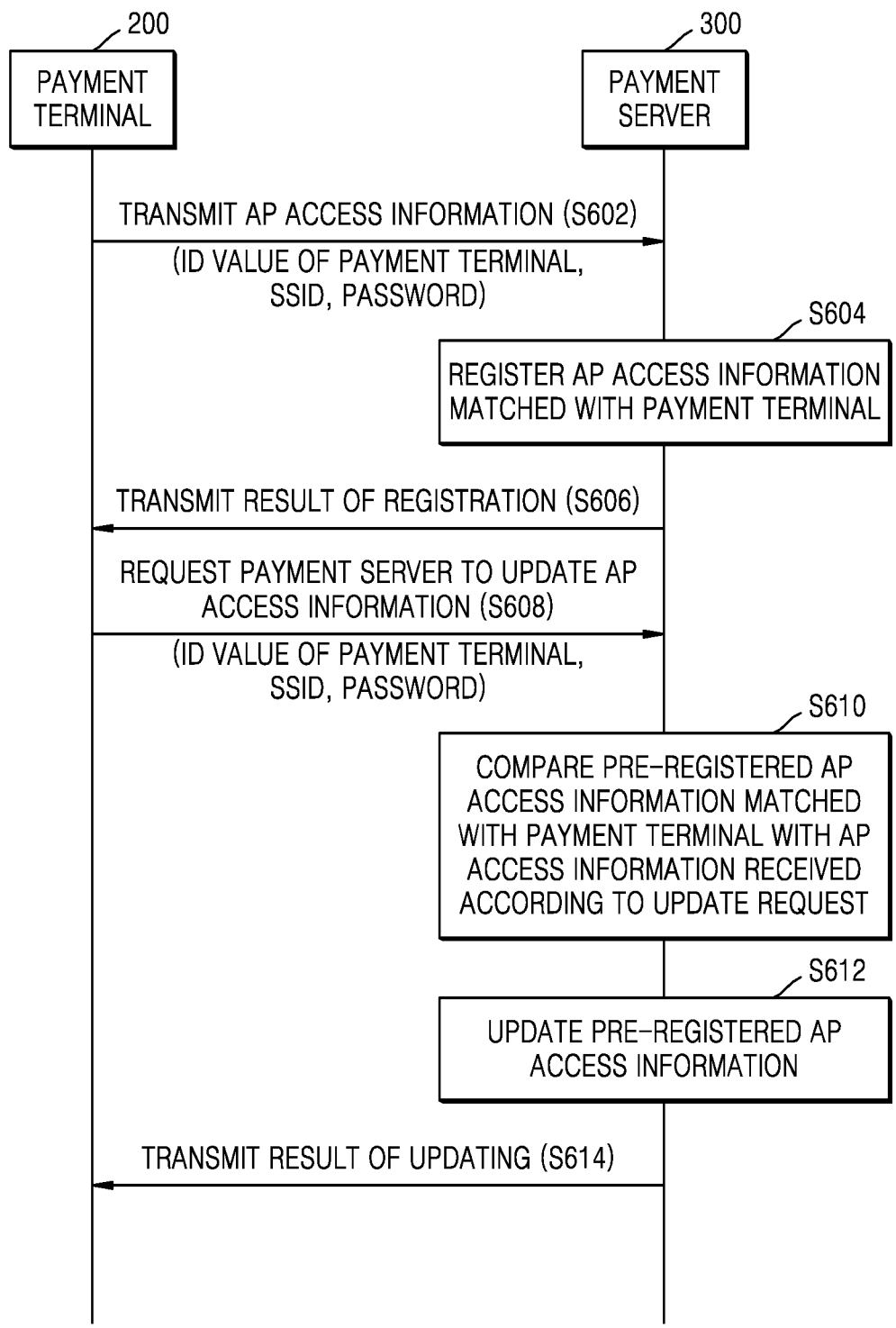
FIG. 6 is a flowchart illustrating access information being registered and updated in a payment server according to an embodiment of the present disclosure.

FIG. 6 is a flowchart illustrating access information being registered and updated in a payment server according to an embodiment of the present disclosure.

Referring to FIG. 6, in operation S602, the payment terminal 200 may transmit to the payment server 300 access information used to access an AP of a store including the payment terminal 200 provided therein. For example, the payment terminal 200 may transmit access information including an SSID and a password of the AP of the store including the payment terminal 200 together with the ID value of the payment terminal 200.

In operation S604, the payment server 300 may register access information matched with the payment terminal 200. For example, when the payment terminal 200 is a pre-registered terminal, the payment server 300 may match an ID value of the pre-registered payment terminal 200 with the access information received from the payment terminal 200 and register a result of the matching in the payment server 300. The payment server 300 may store the access information matched with the ID value of the payment terminal 200 in the DB of the payment server 300, thereby registering the access information. The payment server 300 may generate a matching table including respective ID values of a plurality of payment terminals and pieces of access information corresponding to the ID values.

In operation S606, the payment server 300 may transmit to the payment terminal 200 a result of the registration of the access information matched with the payment terminal 200.

In operation S608, the payment terminal 200 may request the payment server 300 to update the access information matched with the payment terminal 200. For example, when an error exists in the result of the registration of the access information received from the payment server 300 or the AP is changed due to a replacement of the AP, the payment terminal 200 may request the payment server 300 to update the access information.

The payment terminal 200 may request the payment server 300 to update the access information, by transmitting an SSID and a password of a changed AP together with the ID value of the payment terminal 200 to the payment server 300.

In operation S610, the payment server 300 may compare the pre-registered access information matched with the payment terminal 200 having requested the updating with access information received according to the update request. In operation S612, the payment server 300 may update the pre-registered access information matched with the payment terminal 200, based on a result of the comparison. For example, when the two pieces of access information are not identical with each other, the payment server 300 may replace the pre-registered access information matched with the payment terminal 200 with the access information received according to the update request and may register the replacement access information.

In operation S614, the payment server 300 may transmit a result of the updating to the payment terminal 200. For example, when the payment server 300 has updated the pre-registered access information matched with the payment terminal 200, the payment server 300 may transmit updated access information. Alternatively, when the pre-registered access information is identical with the received access information and thus the payment server 300 does not update the pre-registered access information, the payment server 300 may transmit the pre-registered access information as a result of the updating.

According to an embodiment of the present disclosure, the access information matched with the payment terminal 200 may be updated at regular time intervals (for example, at intervals of one month or one year).

Figure 7:
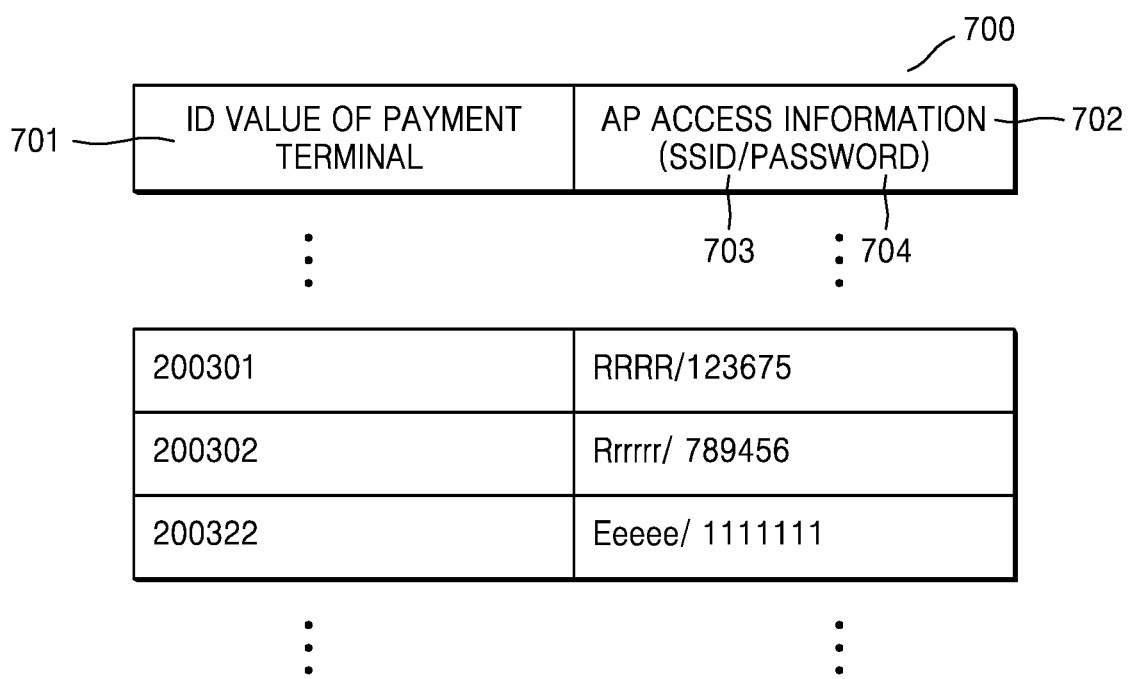
FIG. 7 is a matching table including an identification (ID) value of a payment terminal and access information according to an embodiment of the present disclosure.

FIG. 7 is a matching table including an ID value of a payment terminal and access information according to an embodiment of the present disclosure.

Referring to FIG. 7, the payment server 300 may generate a matching table 700 including an ID value 701 of at least one payment terminal and access information 702 corresponding to the ID value 701. For example, the access information 702 may include an SSID 703 and a password 704 of an AP of a store in which each payment terminal is provided.

For example, when the ID value of the payment terminal 200 is '200301' and a payment is authenticated according to a payment authentication request received from the payment terminal 200, the payment server 300 may transmit 'SSID: RRRR, password:123675' corresponding to the ID value 701 of the payment terminal as the access information 702 to the mobile device 100.

Figure 8:
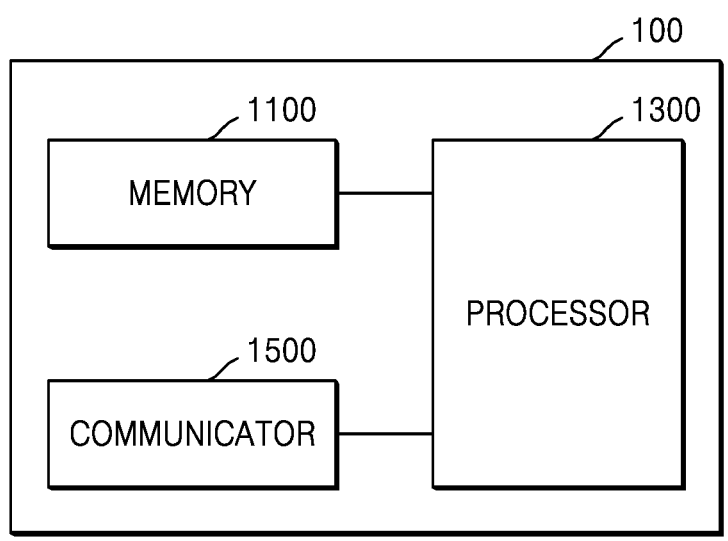
FIGS. 8 and 9 are block diagrams of a structure of a mobile device according to an embodiment of the present disclosure.
Figure 9:
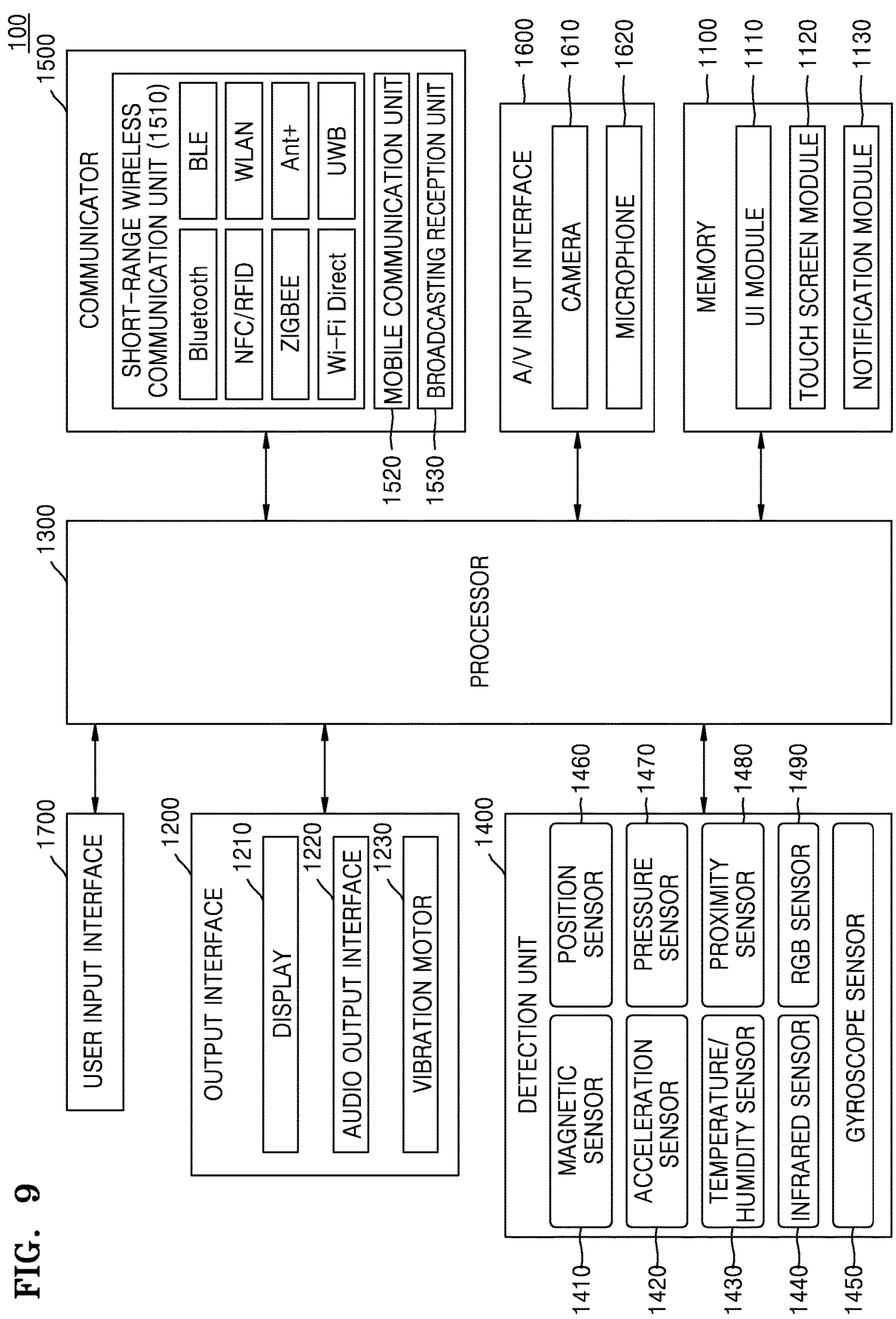

FIGS. 8 and 9 are block diagrams of a structure of a mobile device according to an embodiment of the present disclosure.

Referring to FIG. 8, the mobile device 100 according to an embodiment may include a memory 1100, a communicator 1500, and a processor 1300.

However, all of the components illustrated in FIG. 8 are not essential components of the mobile device 100. More or less components than those illustrated in FIG. 8 may constitute the mobile device 100.

For example, referring to FIG. 9, the mobile device 100 according to an embodiment may further include an output interface 1200, a detection unit 1400, an audio/video (A/V) input interface 1600, and a user input interface 1700, in addition to the memory 1100, the communicator 1500, and the processor 1300.

The memory 1100 may store a program used by the processor 1300 to perform processing and control, and may also store data that is input to or output from the mobile device 100. The memory 1100 may also store access information used to access an AP.

The memory 1100 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 1100 may be classified into a plurality of modules according to their functions, for example, a UI module 1110, a touch screen module 1120, and a notification module 1130.

The UI module 1110 may provide a UI, graphical user interface (GUI), or the like that is specialized for each application and interoperates with the mobile device 100. The touch screen module 1120 may detect a touch gesture on a touch screen of a user and transmit information regarding the touch gesture to the processor 1300. The touch screen module 1120 according to an embodiment may recognize and analyze a touch code. The touch screen module 1120 may be configured by separate hardware including a controller.

The notification module 1130 may generate a signal for notifying that an event has been generated in the mobile device 100. Examples of the event generated in the mobile device 100 may include call signal receiving, message receiving, a key signal input, schedule notification, and the like. The notification module 1130 may output a notification signal in the form of a video signal via a display 1210, in the form of an audio signal via an audio output interface 1220, or in the form of a vibration signal via a vibration motor 1230.

The output interface 1200 may output the audio signal, the video signal, or the vibration signal, and may include the display 1210, the audio output interface 1220, and the vibration motor 1230.

The display 1210 displays information that is processed by the mobile device 100. The display 1210 may display a UI for executing an operation related to a user input in response to the user input.

The audio output interface 1220 outputs audio data that is received from the communicator 1500 or stored in the memory 1100. The audio output interface 1220 may also output an audio signal (for example, a call signal receiving sound, a message receiving sound, a notification sound) related with a function of the mobile device 100.

The processor 1300 includes at least one processor and controls all operations of the mobile device 100. For example, the processor 1300 may control the user input interface 1700, the output interface 1200, the detection unit 1400, the communicator 1500, the A/V input interface 1600, and the like by executing programs stored in the memory 1100. The processor 1300 may perform a function of the mobile device 100 of FIGS. 1-7, by executing the programs stored in the memory 1100.

Specifically, in order to access the AP 400 of a store including the payment terminal 200 provided therein, the processor 1300 may request the payment terminal 200 to pay a service or product provided by the store. For example, the processor 1300 may transmit card information for a payment and an ID value of the mobile device 100 to the payment terminal 200 via the communicator 1500. The processor 1300 may transmit the card information for the payment to the payment terminal 200 by generating a magnetic field by using an MST module.

As the payment is authenticated by the payment server 300 connected to the payment terminal 200 via the communicator 1500, the processor 1300 may receive the access information used to access the AP 400 from the payment server 300. For example, the processor 1300 may receive an SSID and a password of the AP 400 via a mobile communication unit 1520. For example, the processor 1300 may receive access information of an AP corresponding to the ID value of the payment terminal 200 from the payment server 300 via the communicator 1500. The processor 1300 may receive access information from the payment server 300 via the communicator 1500, based on the ID value of the mobile device 100.

According to an embodiment of the present disclosure, the processor 1300 may receive access information encrypted using a preset public key, via the communicator 1500. The processor 1300 may decrypt the received encrypted access information by using the preset public key.

The processor 1300 may access the AP 400, based on the received access information. For example, the processor 1300 may extract the SSID and the password from the access information. The processor 1300 may identify the AP 400 of the store from among found APs, by using the extracted SSID. The processor 1300 may input the extracted password to access the identified AP 400.

The processor 1300 may activate a WLAN accessing function of the mobile device 100, as the access information is received from the payment server 300. For example, the access information may include an instruction for activating the wireless LAN accessing function of the mobile device 100.

According to an embodiment of the present disclosure, the processor 1300 may perform a payment request that makes the payment terminal 200 transmit the access information of the AP of the store to the payment server 300 via the communicator 1500.

The detection unit 1400 may sense the status of the mobile device 100 or the status of the surrounding of the mobile device 100 and may transmit information corresponding to the sensed status to the processor 1300.

The detection unit 1400 may include, but is not limited thereto, at least one selected from a magnetic sensor 1410, an acceleration sensor 1420, a temperature/humidity sensor 1430, an infrared sensor 1440, a gyroscope sensor 1450, a position sensor (e.g., a GPS) 1460, a pressure sensor 1470, a proximity sensor 1480, and an red, green, blue (RGB) sensor 1490 (i.e., an illuminance sensor). Functions of most of the sensors would be instinctively understood by one of ordinary skill in the art in view of their names and thus detailed descriptions thereof will be omitted herein.

The communicator 1500 may include at least one component that enables the mobile device 100 to communicate with another device (not shown) and a server (not shown). The other device (not shown) may be a computing device, such as the mobile device 100, or a detection device, and embodiments are not limited thereto. For example, the communicator 1500 may include a short-range wireless communication unit 1510, the mobile communication unit 1520, and a broadcasting reception unit 1530.

The short-range wireless communication unit 1510 may include, but is not limited to, a Bluetooth communication unit, a BLE communication unit, an NFC unit, a WLAN (e.g., Wi-Fi) communication unit, a ZigBee communication unit, an IrDA communication unit, a WFD communication unit, a UWB communication unit, an Ant+ communication unit, an MST communication unit, and the like. For example, the short-range wireless communication unit 1510 may request the payment terminal 200 to pay a service or product provided by the store, under the control of the processor 1300. For example, the MST communication unit may transmit the card information for the payment stored in the memory 1100 to the payment terminal 200 by generating a magnetic field.

The mobile communication unit 1520 may exchange a wireless signal with at least one selected from a base station, an external terminal, and a server on a mobile communication network. Here, examples of the wireless signal may include a voice call signal, a video call signal, and various types of data according to text/multimedia messages transmission. For example, the mobile communication unit 1520 may receive the access information from the payment server 300.

The broadcasting reception unit 1530 receives a broadcasting signal and/or broadcasting-related information from an external source via a broadcasting channel. The broadcasting channel may be a satellite channel, a ground wave channel, or the like. According to embodiments of the present disclosure, the mobile device 100 may not include the broadcasting reception unit 1530.

The communicator 1500 may transmit or receive, to or from the other device (not shown) and the server (not shown), information necessary for requesting a response message for a voice input of a user and execute an operation related with the response message.

The A/V input interface 1600 is to input an audio signal or a video signal, and may include a camera 1610 and a microphone 1620. The camera 1610 may acquire an image frame, such as a still image or a moving picture, via an image sensor in a video call mode or a photography mode. An image captured via the image sensor may be processed by the processor 1300 or a separate image processor (not shown). The image captured by the camera 1610 may be utilized as user data.

The microphone 1620 receives an external audio signal and converts the external audio signal into electrical audio data. For example, the microphone 1620 may receive an audio signal from an external device or a user. The microphone 1620 may receive a voice input of the user. The microphone 1620 may use various noise removal algorithms in order to remove noise that is generated while receiving the external audio signal.

The user input interface 1700 allows the user to input data for controlling the mobile device 100. For example, the user input interface 1700 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

Figure 10:
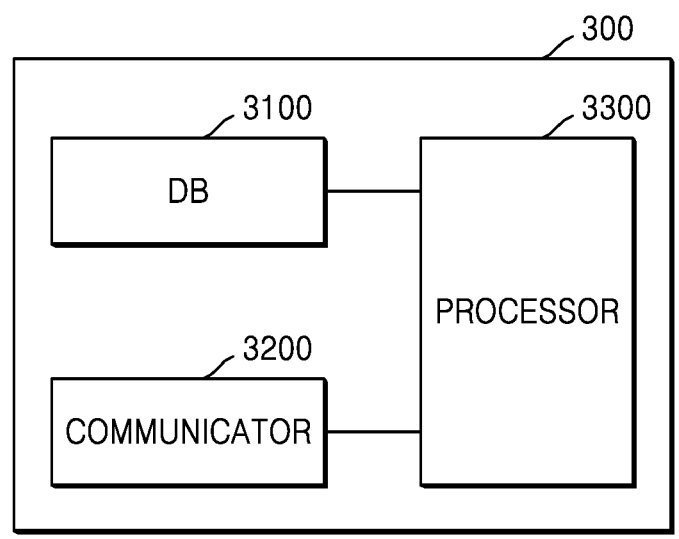
FIG. 10 is a block diagram of a structure of a payment server according to an embodiment of the present disclosure.

FIG. 10 is a block diagram of a structure of a payment server according to an embodiment of the present disclosure.

Referring to FIG. 10, the payment server 300 may include a DB 3100, a communicator 3200, and a processor 3300. The payment server 300 may be implemented by more or less components than those illustrated in FIG. 10.

The DB 3100 may store access information used to access an AP. The DB 3100 may store access information matched to the payment terminal 200 and registered. For example, the DB 3100 may store a matching table including the ID value of the payment terminal 200 and access information of the AP corresponding to the ID value.

The communicator 3200 may include at least one component that enables the payment server 300 to communicate with the mobile device 100 and the payment terminal 200. The communicator 3200 may communicate with the mobile device 100 and the payment terminal 200 via a network for mobile communication, but embodiments are not limited thereto.

The processor 3300 includes at least one processor and controls all operations of the payment server 300. For example, the processor 3300 may control the DB 3100 and the communicator 3200 by executing the programs stored in the DB 3100. The processor 3300 may perform an operation of the payment server 300 of FIGS. 1-7, by executing the programs stored in the DB 3100.

The processor 3300 may receive a payment authentication request from the payment terminal 200 via the communicator 3200. For example, as the mobile device 100 requests the payment terminal 200 to pay a service or product provided by the store including the payment terminal 200, the processor 3300 may receive an authentication request for the payment from the payment terminal 200.

The processor 3300 may authenticate the payment for the service or product provided by the store including the payment terminal 200. For example, the processor 3300 may receive payment card information, a payment cost, and the ID value of the payment terminal 200 from the payment server 200 via the communicator 3200. The processor 3300 may authenticate the payment by using the received payment cost and the received payment card information.

The processor 3300 may transmit access information used to access the AP 400 of the store including the payment terminal 200 to the mobile device 100 having requested the payment, based on a result of the authentication of the payment. For example, when the payment requested by the payment terminal 200 is authenticated by the processor 3300, the processor 3300 may transmit access information used by the mobile device 100 to access the AP 400 to the mobile device 100 via the communicator 3200.

According to an embodiment of the present disclosure, the processor 3300 may transmit the ID value of the payment terminal 200 and access information corresponding to the ID value to the mobile device 100 via the communicator 3200. The processor 3300 may match the access information with the payment terminal 200 and register a result of the matching. For example, the processor 3300 may store the registered access information in the DB 3100. For example, the processor 3300 may store a matching table including the ID value of the payment terminal 200 and access information of the AP corresponding to the ID value in the DB 3100.

The present disclosure can also be embodied as a storage medium including instruction codes executable by a computer, such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information, such as computer readable instruction code, a data structure, a program module or other data. The communication medium typically includes the computer readable instruction code, the data structure, the program module, or other data of a modulated data signal, such as a carrier wave, or other transmission mechanism, and includes any information transmission medium.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The terminology "~unit" used herein may be a hardware component, such as a processor or a circuit, and/or a software component that is executed by a hardware component, such as a processor.

Although the embodiments of the present disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

While the present disclosure has been shown and described with reference to various embodiments thereof, it will be understood by those skilled in the art that various changes in form and details may be made therein without departing from the spirit and scope of the present disclosure as defined by the as defined by the appended claims and their equivalents.

What is claimed is:

1. A method performed by a mobile device, the mobile device comprising a communicator, a processor, and a memory storing at least one program including instructions which, when executed by the processor, causes the processor to control the communicator to access an access point (AP) of a wireless local area network (WLAN) provided by a store and control to perform the method, the method comprising:
    encrypting, by the processor, card information for a payment stored in the memory using a preset public key shared between the mobile device and a payment server;
    generating, by the communicator, a magnetic field corresponding to the encrypted card information, in order to access the AP;
    transmitting, by the communicator, the magnetic field to a payment terminal;
    receiving, by the communicator, a wireless signal encrypted by the preset public key for access information used to access the AP from the payment server connected to the payment terminal via a network, as the payment is authenticated by the payment server, wherein the access information comprises a service set identifier (SSID) and a password of the AP;
    in response to receiving the wireless signal, searching, by the processor, for at least one AP that provides access to the WLAN;
    decrypting, by the processor, the received wireless signal using the preset public key;
    extracting, by the processor, the SSID from the decrypted wireless signal;
    identifying, by the processor, the AP from among the searched at least one AP using the extracted SSID;
    transmitting, by the communicator, an access signal to the identified AP;
    in response to receiving a request signal for the password from the identified AP, extracting, by the processor, the password of the identified AP from the decrypted wireless signal; and
    accessing, by the processor, the identified AP by inputting the extracted password of the identified AP.

2. The method of claim 1,
    wherein the AP is provided in the store in which the payment terminal is provided, and
    wherein the access information used to access the AP is matched with the payment terminal and registered in the payment server.

3. The method of claim 1, wherein:
    in response to the transmitting of the magnetic field, the payment terminal transmits a payment cost for a service or a product and an identification (ID) value of the payment terminal to the payment server, and
    the receiving of the wireless signal comprises receiving, from the payment server, access information of the AP corresponding to the ID value of the payment terminal, as the payment is authenticated by the payment server.

4. The method of claim 1, wherein:
in response to the transmitting of the magnetic field, the payment terminal transmits access information of the AP provided in the store to the payment server, and
the receiving of the wireless signal comprises, as the access information of the AP is matched with the payment terminal and registered in the payment server, receiving the registered access information from the payment server.

5. The method of claim 1, wherein:
the transmitting of the magnetic field comprises transmitting card information for the payment pre-stored in the mobile device and an ID value of the mobile device to the payment terminal,
in response to the transmitting of the magnetic field, the payment terminal transmits the card information for the payment and the ID value of the mobile device to the payment server, and
the ID value of the mobile device is used to receive the access information from the payment server.

6. A mobile device comprising:
a memory configured to store at least one program;
at least one communicator configured to transmit or receive data to or from a payment terminal and a payment server; and
a processor configured to execute the at least one program so that the mobile device accesses an access point (AP) of a wireless local area network (WLAN) provided by a store,
wherein the at least one program comprises instructions for executing operations of:
  encrypting, by the processor, card information for a payment stored in the memory using a preset public key which is shared between the mobile device and the payment server;
  generating, by the communicator, a magnetic field corresponding to the encrypted card information, in order to access the AP;
  transmitting, by the communicator, the magnetic field to the payment terminal;
  receiving, by the communicator, a wireless signal encrypted by the preset public key for access information used to access the AP from the payment server connected to the payment terminal via a network, as the payment is authenticated by the payment server, wherein the access information comprises a service set identifier (SSID) and a password of the AP;
  in response to receiving the wireless signal, searching, by the processor, for at least one AP that provides access to the WLAN;
  decrypting, by the processor, the received wireless signal using the preset public key;
  extracting, by the processor, the SSID from the decrypted wireless signal;
  identifying, by the processor, the AP from among the searched at least one AP using the SSID;
  transmitting, by the communicator, an access signal to the identified AP;
  in response to receiving a request signal for the password from the identified AP, extracting, by the processor, the password of the identified AP from the decrypted wireless signal; and
  accessing, by the processor, the identified AP by inputting the extracted password of the identified AP.

7. The mobile device of claim 6,
wherein the AP is provided in the store in which the payment terminal is provided, and
wherein the access information used to access the AP is matched with the payment terminal and registered in the payment server.

8. The mobile device of claim 6, wherein:
in response to the transmitting of the magnetic field, the payment terminal transmits a payment cost for a service or a product and an identification (ID) value of the payment terminal to the payment server, and
the receiving of the wireless signal comprises receiving, from the payment server, access information of the AP corresponding to the ID value of the payment terminal, as the payment is authenticated by the payment server.

9. The mobile device of claim 6, wherein:
in response to the transmitting of the magnetic field, the payment terminal transmits, to the payment server, access information of the AP provided in the store, and
the receiving of the wireless signal comprises, as the access information of the AP is matched with the payment terminal and registered in the payment server, receiving the registered access information from the payment server.

10. The mobile device of claim 6, wherein:
the transmitting of the magnetic field comprises transmitting card information for the payment pre-stored in the mobile device and an ID value of the mobile device to the payment terminal,
in response to the transmitting of the magnetic field, the payment terminal transmits the card information for the payment and the ID value of the mobile device to the payment server, and
the ID value of the mobile device is used to receive the access information from the payment server.

11. At least one non-transitory computer-readable recording medium having recorded thereon a computer program including instructions which, when executed by a processor of a mobile device comprising a memory and a communicator, causes the processor to control to perform a method for accessing an access point (AP) of a wireless local area network (WLAN) provided by a store, the method comprising:
  encrypting, by the processor, card information for a payment stored in the memory using a preset public key shared between the mobile device and a payment server;
  generating, by the communicator, a magnetic field corresponding to the encrypted card information, in order to access the AP;
  transmitting, by the communicator, the magnetic field to a payment terminal;
  receiving, by the communicator, a wireless signal encrypted by the preset public key for access information used to access the AP from the payment server connected to the payment terminal via a network, as the payment is authenticated by the payment server, wherein the access information comprises a service set identifier (SSID) and a password of the AP;
  in response to receiving the wireless signal, searching, by the processor, for at least one AP that provides access to the WLAN;
  decrypting, by the processor, the received wireless signal using the preset public key;
  extracting, by the processor, the SSID from the decrypted wireless signal;
  identifying, by the processor, the AP from among the searched at least one AP using the extracted SSID;

transmitting, by the communicator, an access signal to the identified AP;

in response to receiving a request signal for the password from the identified AP, extracting, by the processor, the password of the identified AP from the decrypted wireless signal; and accessing, by the processor, the identified AP by inputting the extracted password of the identified AP.

* * * * *